June 12, 1928.

O. S. CAESAR

VEHICLE BUMPER

Filed Jan. 23, 1928

1,673,392

Inventor
ORVILLE S. CAESAR

By

Attorneys

Patented June 12, 1928.

1,673,392

UNITED STATES PATENT OFFICE.

ORVILLE S. CAESAR, OF CHICAGO, ILLINOIS, ASSIGNOR TO TROPIC-AIRE, INCORPORATED, OF MINNEAPOLIS, MINNESOTA, A CORPORATION OF DELAWARE.

VEHICLE BUMPER.

Application filed January 23, 1928. Serial No. 248,755.

This invention relates to new and useful improvements in bumpers, generally, and more particularly to bumpers adapted for use in connection with heavy buses and trucks, to provide a resilient bumper for the forward end thereof. The improved bumper also functions as a cross member for securing together the forward ends of the chassis side beams.

A further object is to provide a bumper comprising a cross member adapted to be connected with the forward ends of the side beams of a vehicle chassis, and having lateral extensions adapted to be secured to the fenders to provide a support therefor; a forward resilient member having its opposed end portions bent rearwardly and inwardly and terminally secured to the cross member, and having its intermediate portion spaced from the intermediate portion of the cross member, and a bar being interposed between the intermediate portions of said resilient member and said cross member and connected therewith, thus providing a very rugged bumper particularly adapted for use on heavy buses and trucks.

A further object of the invention is to provide a bumper comprising a cross member adapted to be secured to the forward end of the chassis side beams, to provide a tie therebetween, and a resilient member being detachably mounted forwardly of the cross member, whereby it may readily be removed for repairs or replacement, in the event it is damaged, said resilient member functioning to provide a resilient guard for protecting the forward end of the vehicle as, for example, the usual pneumatic or hydraulic shock absorbers, the guide bracket for the engine crank, the radiator, and the front fenders.

Other objects of the invention are to provide a bumper constructed in such a manner that it may be used as a cross member for connecting together the forward ends of the vehicle chassis side beams to minimize twisting and weaving of the chassis frame; to provide a bumper having means for securing it to the front fenders to provide a support therefor; to provide a bumper comprising a cross-member and a resilient member mounted forwardly thereof and in spaced relation with respect thereto and having means for connecting it with the cross member and with the usual shock absorbers, connecting the forward ends of the chassis frame with the forward ends of the vehicle springs; to provide a bumper comprising three members secured together in spaced relation and having means for securing them to the forward ends of a vehicle chassis side beams and fenders, and also to the usual shock absorbers of the vehicle, said members substantially encircling the shock absorbers to provide a guard therefor; and, in the general construction of the bumper which is such as to permit the apparatus to be manufactured at a very nominal cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 1:
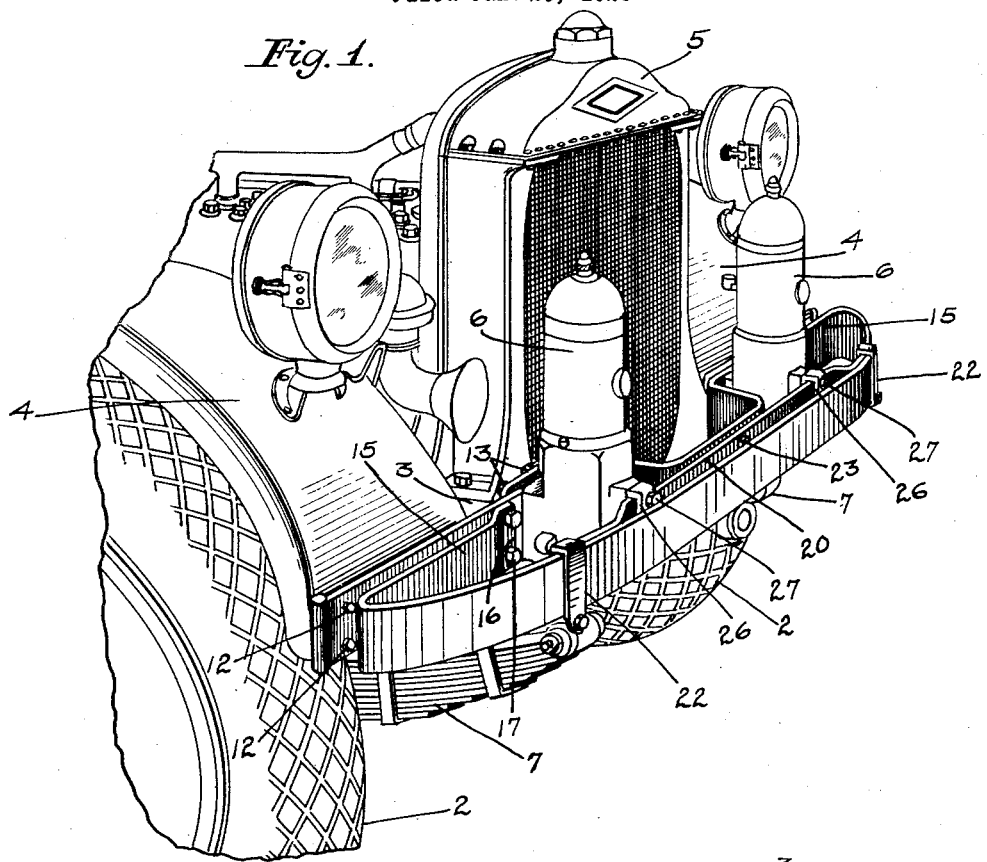
Figure 1 is a perspective view showing the forward end of a motor vehicle with the improved bumper mounted thereon.

In the selected embodiment of the invention here shown, there is illustrated for purposes of disclosure, the forward end of a conventional type of bus comprising the usual front wheels 2, chassis side beams 3, fenders 4, radiator 5, shock absorbers 6, and springs 7.

Figure 2:
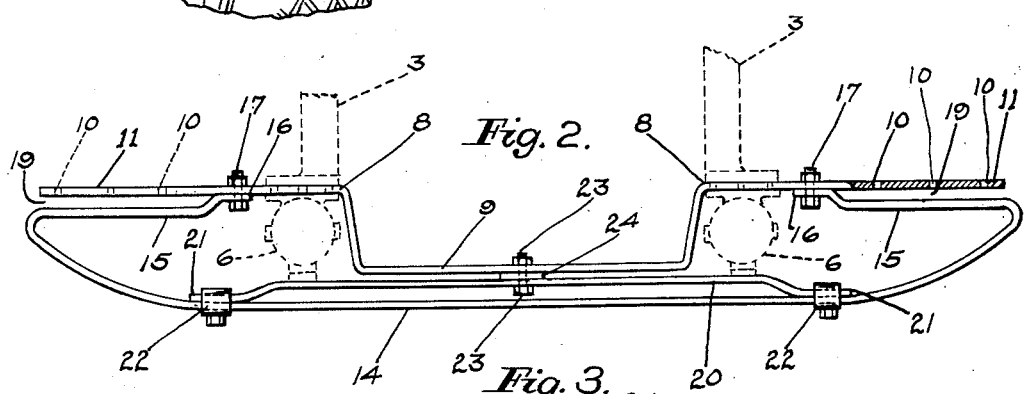
Figure 2 is a plan view of the bumper.
Figure 3:
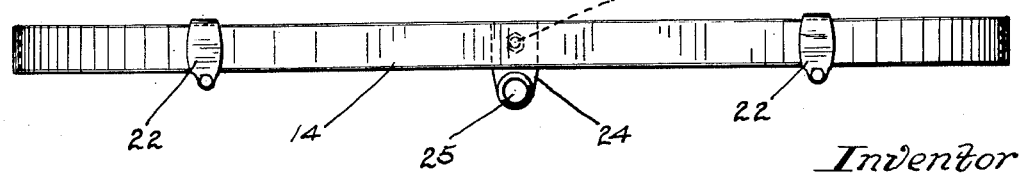
Figure 3 is a front elevation of Figure 2.

The novel bumper featured in this invention is adapted to be mounted upon the forward end of a bus as shown in Figure 1. The bumper comprises a cross member 8 having an off-set central portion 9 extending forwardly as shown in Figure 2. The opposed end portions or extensions 11 of the cross member 8 have apertures 10 therein and are adapted to be secured to the forward ends of the fenders 4 by means of bolts 12, as shown in Figure 1. The cross member 8 is interposed between the forward ends of the chassis side beams 3 and the shock absorbers 6, and is secured thereto by bolts 13.

A resilient member 14 is provided forwardly of the cross member 8 and has its opposed end portions 15 bent rearwardly and inwardly, as shown in Figures 1 and 2. The terminals 16 of the end portions 15 are off-set and are secured to the lateral extensions 11 of the cross member 8 by such means as bolts 17. As a result of the terminals 16 being off-set, the end portions 11 and 15 respectively of the members 8 and 14 will be spaced from one another as indicated at 19. It will also be seen by reference to Figure 2, that the intermediate forward portion of the member 14 is spaced from the intermediate off-set portion 9 of the cross member 8. A bar 20 is interposed between the intermediate portions of the cross members 8 and 14, and has its terminals 21 off-set and secured to the resilient member 14 by such means as clamps 22. The central portion of the bar 20 is secured to the off-set portion 9 of the member 8 by means of a bolt 23. A bracket 24 is interposed between the bar 20 and the forward portion 9 of the member 8 and is rigidly secured therebetween by means of a bolt 23, which passes through alined apertures provided in the bar 20, bracket 24, and member 9. The bracket 24 has a socket 25 therein adapted to receive the shank of the usual engine crank, to provide a guide therefor in the event it becomes necessary to crank the engine manually.

In the form of chassis here shown, the shock absorbers 6 provide connections between the forward ends of the springs 7 and the chassis side beams 3. The bar 20 is preferably secured to the shock absorbers 6 by means of clamping members 26 and bolts 27. The shock absorbers 6 are thus substantially encircled by the members constituting the bumper, thereby providing a guard for protecting the shock absorbers in the event that the bus collides with some other vehicle or object.

The novel bumper featured in this invention, in addition to providing a bumper for the vehicle, also functions as a cross member for connecting together the forward ends of the chassis side beams, thereby eliminating twisting and weaving of the frame, when traveling over rough roads. It also functions as a guard to protect the shock absorbers, and provides a rigid support for the front fenders as a result of the latter being bolted to the lateral extensions 11 of the cross member 8.

An important feature of the invention resides in the general arrangement of the parts comprising the bumper. Referring to Figure 2, it will be noted that the end portions 15 of the resilient member 14 are spaced from the lateral extensions 11 of the cross member 8. Similarly, the intermediate portions of the members 9, 14, and 20 are arranged in spaced relation so that the member 14 may flex and yield when struck by an object. The members 8, 14, and 20 of the bumper are preferably constructed of strap iron, of a size suitable to provide maximum strength and resiliency. The bumper, when secured to the chassis as shown in Figure 1, virtually becomes an integral part of the vehicle chassis. The construction of the bumper is also such that it may be manufactured at a minimum cost, and, when mounted upon the vehicle as shown in Figure 1, provides a very practical bumper and guard for protecting the forward end of the vehicle. As before stated, should the resilient member 14 accidentally become damaged as a result of the bumper impacting with another vehicle or with an object, then said member may readily be removed from the vehicle for repairs and replacement without having to remove the cross member 8 or the bar 20.

I claim as my invention:

1. The combination with a vehicle chassis including a pair of side beams, of a cross member connected with the forward ends of said beams and having opposed lateral extensions, a transverse bar secured to said cross member intermediately thereof and having its end portions off-set forwardly, and a resilient member mounted forwardly of said cross member and said bar and demountably secured thereto, said resilient member extending substantially the full width of the vehicle and having its opposed end portions curved rearwardly and engaged with the lateral extensions of said cross member.

2. The combination with a vehicle chassis including side beams and front fenders, of a cross member connected with the forward ends of said beams and having lateral extensions secured to said fenders, and a forward resilient member having its opposed ends bent rearwardly and inwardly and terminally secured to said cross member, the intermediate portion of said resilient member being spaced from said cross member.

3. The combination with a vehicle chassis including side beams and front fenders, of a cross member connected with the forward ends of said beams and having lateral extensions secured to said fenders, and a forward resilient member having its opposed ends bent rearwardly and inwardly and terminally secured to said cross member, the intermediate portion of said resilient member being spaced from the intermediate portion of said cross member and having a connection therewith.

4. The combination with a vehicle chassis including side beams and front fenders, of a cross member connected with the forward ends of said beams and said fenders, a forward resilient member having its opposed ends bent rearwardly and inwardly and terminally secured to said cross member, and a relatively shorter member interposed between the intermediate portions of said cross member and said resilient member and connected therewith.

5. The combination with a vehicle chassis including side beams and front fenders, of a cross member connected with the forward ends of said beams and having its intermediate portion off-set forwardly, a forward resilient member having its opposed ends bent rearwardly and inwardly and terminally secured to said cross member, and the intermediate portion of said resilient member being spaced from the off-set portion of said cross member and having a connection therewith.

6. The combination with a vehicle chassis including side beams, front fenders and shock absorbers secured to the forward ends of the beams, of a cross member connected with the forward ends of said beams and having lateral extensions secured to said fenders, the intermediate portion of said cross member being off-set forwardly, a forward resilient member having its opposed end portions bent rearwardly and inwardly and terminally secured to said cross member adjacent to said shock absorbers, the intermediate portion of said resilient member being spaced from the off-set portion of said cross member, and a bar interposed between the intermediate portions of said cross member and resilient member and spaced therefrom, said bar being secured to the off-set portion of said cross member and having its opposed ends connected with said resilient member.

7. In a device of the class described, the combination of a cross member having its intermediate portion off-set and its opposed end portions adapted to be secured to a vehicle chassis, a resilient member having its intermediate portion spaced from said cross member and having its opposed end portions bent rearwardly and inwardly and terminally secured to said cross member, a bar interposed between the intermediate portions of said resilient member and said cross member and spaced from said members, the intermediate portion of said bar being secured to said cross member, and the opposed end portions of the bar being off-set forwardly and terminally secured to said resilient member.

8. In a device of the class described, the combination of a cross member having its intermediate portion off-set and its opposed end portions adapted to be secured to a vehicle chassis, a resilient member having its intermediate portion spaced from said cross member and having its opposed end portions bent rearwardly and inwardly and demountably secured to said cross member, a bar interposed between the intermediate portions of said resilient member and said cross member and spaced from said members, the intermediate portion of said bar being secured to said cross member and the opposed end portions of said bar being off-set forwardly and demountably secured to said resilient member.

9. A vehicle bumper comprising a cross member adapted to be secured to a vehicle chassis, a resilient member having its intermediate portion spaced from said cross member and having its end portions bent rearwardly and secured to said cross member, and a relatively shorter member interposed between said cross member and said resilient member and secured thereto in spaced relation.

10. A vehicle bumper comprising a cross member adapted to be secured to a vehicle chassis, a resilient member having its end portions secured to said cross member and its intermediate portion spaced therefrom forwardly, and a relatively shorter member interposed between said cross member and said resilient member and spaced therefrom, the intermediate portion of said shorter member being secured to said cross member and the ends thereof being secured to said resilient member.

In witness whereof, I have hereunto set my hand this 14th day of January, 1928.

ORVILLE S. CAESAR.